Sept. 29, 1959 J. U. DALY 2,906,460
SNAP ACTING CONTROL APPARATUS
Filed Nov. 21, 1955 4 Sheets-Sheet 1

INVENTOR.
JAMES U. DALY.
BY
*Albert J. Henderson*
HIS ATTORNEY.

Sept. 29, 1959          J. U. DALY               2,906,460
                  SNAP ACTING CONTROL APPARATUS
Filed Nov. 21, 1955                           4 Sheets-Sheet 2

Sept. 29, 1959        J. U. DALY              2,906,460
              SNAP ACTING CONTROL APPARATUS
Filed Nov. 21, 1955                    4 Sheets-Sheet 3

INVENTOR.
JAMES U. DALY.
BY
HIS ATTORNEY

INVENTOR.
JAMES U. DALY.
BY
HIS ATTORNEY.

United States Patent Office 2,906,460
Patented Sept. 29, 1959

2,906,460

SNAP ACTING CONTROL APPARATUS

James U. Daly, Latrobe, Pa., assignor to Robertshaw-Fulton Controls Company, Greensburg, Pa., a corporation of Delaware Application November 21, 1955, Serial No. 548,017

5 Claims. (Cl. 236—48)

This invention relates to control apparatus and more particularly to thermostatic regulator valves for controlling the flow of fluid.

This invention has utility in connection with regulating valves of the above type, although it is susceptible to many other applications, and therefore the application of the invention shown and described herein is for purposes of illustration and not of limitation.

Regulators of the described type generally utilize a thermostatic power element of either the hydraulic or bimetal type to actuate a valve member between positions relative to a valve seat in response to variations in a temperature condition. For safety reasons the valve member is usually biased toward a closed position relative to the seat by upstream fluid pressure and a spring biasing means. Since fluid fuel burning burners are generally designed to operate at maximum efficiency at full capacity, snap-action mechanisms are generally utilized to actuate the valve member between positions.

There are several disadvantages of the above-described systems, among them being the fact that the biasing force of the snap-action mechanism must be strong enough to overcome the combined biasing force of the valve biasing means and fluid pressure acting on the valve member to move the valve member away from the seat. This has generally been accomplished by incorporating a lever means with the snap-action mechanism for amplifying the biasing force of the snap-action mechanism. While accomplishing this purpose, it has been found that the amplifying effect of the lever means also increases the operating differential of the snap mechanism. Thus, higher valve lifting forces in such devices have been achieved by sacrificing sensitivity.

Another disadvantage in such devices is the tendency for the valve spring to cause double snap of the snap mechanism. For example, the snap mechanism nears the snap point on the closing cycle, the biasing force of the snap mechanism lessens, and a condition sometimes occurs where the valve spring aids in moving the snap lever to a snap position. This results in a varying snap point of the snap mechanism and a varying operating differential.

It is an object of this invention to incorporate in a control device a variable ratio movement transmitting means.

Another object of this invention is to incorporate in a control device a biasing means having a force which varies with the displacement.

Another object of this invention is to prevent double-snap of a snap-action control device.

Another object of this invention is to produce a more efficient control device of the type described.

In one preferred embodiment of the invention valve means are provided for controlling the flow of fluid and means responsive to a temperature condition are positioned to actuate the valve means upon a variation in the temperature condition. Lever means including a snap-action device are provided for transmitting movement from the temperature responsive means to the valve means, said lever means being arranged whereby movement is transmitted from the temperature responsive means to the valve means at one ratio in one position of the valve means and at a different ratio in another position of the valve means. Biasing means are provided which have a force which varies with displacement of the valve means.

Other objects and advantages will become apparent from the following description taken in connection with the accompanying drawings wherein.

Figure 1:
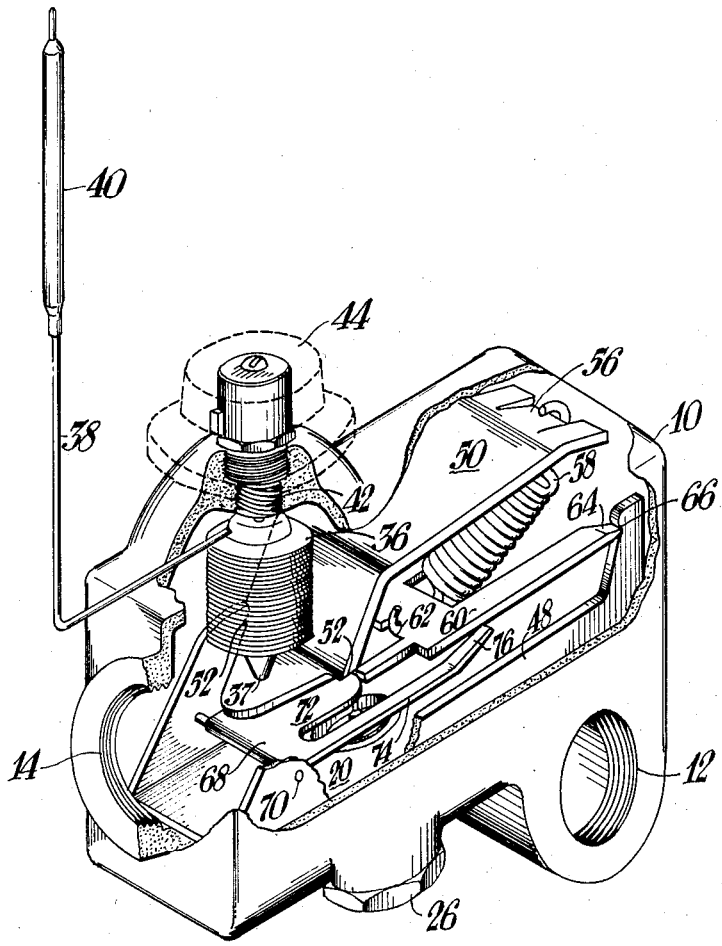
Fig. 1 is a cut-away perspective view of a control device embodying this invention.
Figure 2A:
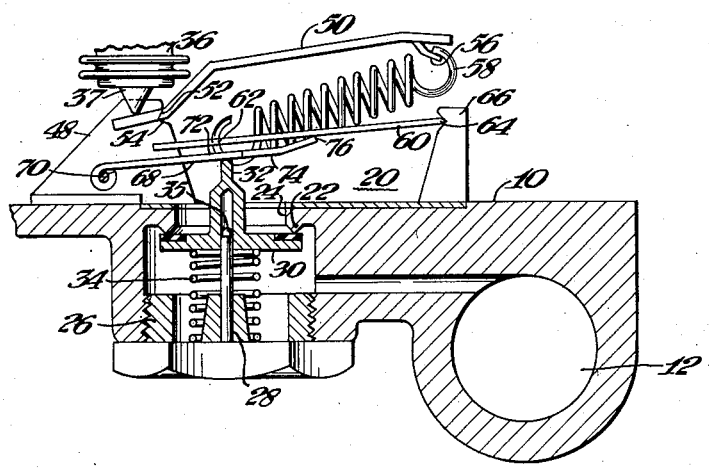
Fig. 2A is a view similar to Fig. 2 showing the parts in another position.
Figure 2B:
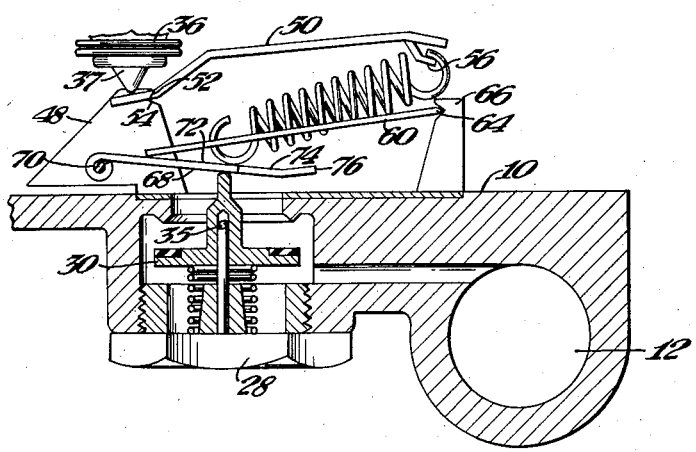
Fig. 2B is a view similar to Fig. 2 showing the parts in still another position.

Referring more particularly to Fig. 1, the control device includes a main casing 10 provided with an inlet 12 and an outlet 14 for fluid and a chamber 20 in the hollow interior thereof which communicates with the inlet 12 and outlet 14.

Figure 2:
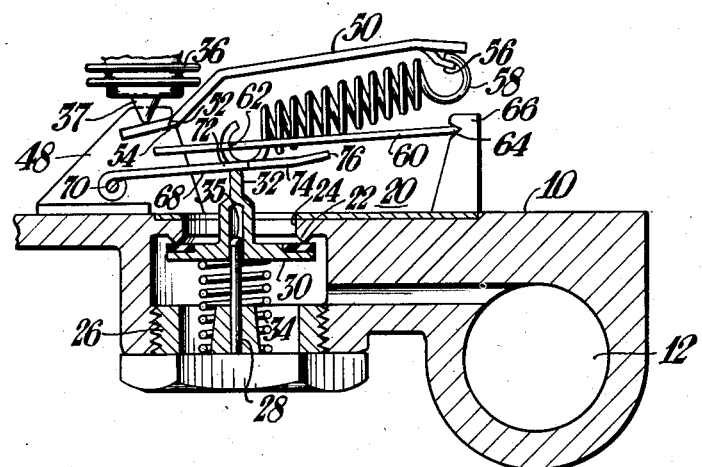
Fig. 2 is a front view in section of a portion of the device shown in Fig. 1.

Referring now to Fig. 2, an annular valve seat 22 is formed on the casing 10 near the inlet 12 and defines a valve port 24 through which fluid may flow from the inlet 12 to the outlet 14. A bushing 26 is threaded in the bottom wall of the casing 10 in axial alignment with the valve seat 22 and provides a convenient means for mounting a valve member within the chamber 20. To this end, a guide stem 28 is secured at one end to the bushing 26 and extends toward the valve seat 22 in axial alignment therewith. A disc-shaped valve member 30 is provided with a centrally disposed bore by means of which the same is slidably mounted on the guide stem 28 in axial alignment with the seat 22.

The upper side of the valve member 30 is provided with an integrally formed stem 32. A spring 34 is mounted in compression between the valve member 30 and the end of the bushing 26 and is operative to bias the valve member 30 toward engagement with the valve seat 22. An abutment 35 may be provided on the end of the stem 28 to retain the valve member 30 on the stem 28 when the bushing 26 is detached from the casing 10. Thus, to remove the valve assembly from the casing 10, it is only necessary to detach the bushing 26.

The thermal control assembly for the device may be of any suitable type and is shown in Figs. 1 and 2 as comprising an expansible bellows member 36 having an operating button 37 and connected by means of a capillary tube 38 to a temperature sensing bulb 40. The bellows 36, tube 38 and bulb 40 are filled with a thermally responsive fluid, preferably a suitable liquid which undergoes volumetric changes in response to temperature changes.

The bellows member 36 is carried by one end of an adjusting stem 42 which is preferably provided with left-hand threads for engagement with a suitable threaded bore in the upper end of the end casing 10. The other end of the adjusting stem 42 projects exteriorly of the casing 10 and has attached thereto a temperature adjusting dial 44.

Movement from the bellows 36 is transmitted to the valve member 30 by snap-action means which are positioned in the chamber 20 between the bellows 36 and valve member 30. To this end, a generally channelshaped support 48 is fixed to a wall of the casing 10 below the bellows 36. The snap-action means includes a main actuating lever 50 which underlies the button 37 and has one end engaging the same. The lever 50 is fulcrumed intermediate the ends thereof by means of a pair of knife edges 52 formed thereon for cooperation with a pair of oppositely disposed bearings 54 formed on the support 48. The other end of lever 50 is also provided with a knife edge 56 around which one end of a coil spring 58 is hooked.

A main control lever 60 of generally H-shaped configuration is provided with a knife edge 62 in the center bar thereof for receiving the opposite hooked end of the coil spring 58. The right legs of the lever 60 are each provided at one end with a knife edge 64 for cooperation with suitable bearings 66 formed on a projecting wall of the support 48.

The structure thus far described constitutes a snap-action mechanism of a type well known to those skilled in the art. It will be apparent that a line between the bearings 54 and bearings 66 defines a center or snap line for the mechanism. Thus, as the liquid in the bulb 40 and capillary tube 38 expands in response to temperatures prevailing at the point where the bulb 40 is located, the bellows member 36 will also expand resulting in movement of the operating button 37 toward the main actuating lever 50 to cause the same to rotate counterclockwise on the bearings 54. Due to the tension of the spring 58, the main control lever 60 will be moved upward with a snap-action as the knife edge 56 moves over-center past the above-defined snap line.

Means are provided for transmitting snap-action movement from the control lever 60 to the valve member 30 at a varying ratio. To this end, a third lever 68 underlies the control lever 60 and is pivoted at one end on the support 48 by means of a pin 70 which has the ends thereof fixed in oppositely disposed walls of the support 48. The lever 68 defines a leg 72 which overlies and engages the stem 32 and a leg 74 which is engageable with the control lever 60. The leg 74 is provided with a bent end portion 76 which extends toward the lever 60 and is engageable with the same when the lever 60 is above the snap line as now will be described.

As shown in Fig. 2, the lever 68 is positioned with respect to the lever 60 whereby both said levers will be substantially parallel to each other when the knife edge 56 is above the snap line. However, since the levers 60 and 68 are pivoted at opposite ends of the support 48, any movements of the levers 60, 68 below the said parallel position thereof will position the levers 60 and 68 in angular relationship with each other. In this parallel relationship of the levers 60, 68 counterclockwise rotation of the lever 60 will cause engagement of the same with the bent end portion 76 of the lever 68. Upon movement of the lever 60 downward to a new position, the angular relationship between the levers 60 and 68 changes, whereby the bent end 76 moves out of engagement with lever 60 and the end of lever 60 moves toward the lever 68. In this new position of the levers 60 and 68, the lever 60 engages lever 68 near the pivot point 70 thereof thereby effecting a new ratio of movement between the lever 60 and valve stem 28.

In operation of the device thus far described, the closed position of the valve member 30 is the normal position of this member whenever the temperature as sensed by the bulb element 40 is above that for which the dial 44 has been set. In this position, the knife edge 56 will be above the snap line previously described and the levers 60 and 68 will be positioned in substantially parallel relationship with each other whereby the lever 60 will engage the portion 76 upon downward movement thereof. The valve member 30 in this position is biased into engagement with the seat 22 by spring 34 and also by the pressure of the fluid within the inlet 12.

Should the temperature of the bulb 40 increase, the bellows member 36 will contract and rotate the lever 50 clockwise on the bearings 54. Upon sufficient clockwise rotation of the lever 50, the knife edge 56 will move across the previously defined snap line to cause over-center snap-action movement of the control lever 60. As the lever 60 moves downward under influence of spring 58 during snap action it will engage the portion 76 and rotate the lever 68 clockwise on the pin 70 which in turn moves the valve member 30 out of engagement with the seat 22. Since the lever 60 is engageable with the portion 76 at the beginning of snap movement thereof, the force of spring 58, transmitted through the levers 60, 68 to the valve member 30, will be maximum and sufficient to overcome the combined biasing force of spring 34 and the fluid pressure in the inlet 12.

Upon unseating of the valve member 30, further movement of the lever 60 in its range of snap movement will cause the same to move out of engagement with portion 76 and into engagement with a portion of the lever 68 nearer to the pivot point 70 thereby reducing the moment arm applied to valve member 32 and providing a normal ratio of movement between the lever 60 and valve member 30. Thus, the ratio of movement between the valve member 30 and lever 60 changes during snap movement of lever 60 and accordingly a higher lifting force for the valve member 30 is obtained while maintaining positive snap opening thereof.

Since the ratio of movement between the lever 60 and valve member 30 is low during the unseating of the valve member 30, the differential of the snap action mechanism is not affected. It should now be apparent that the device is capable of new and novel functions and accordingly accomplishes the objects of the invention.

Figure 3:
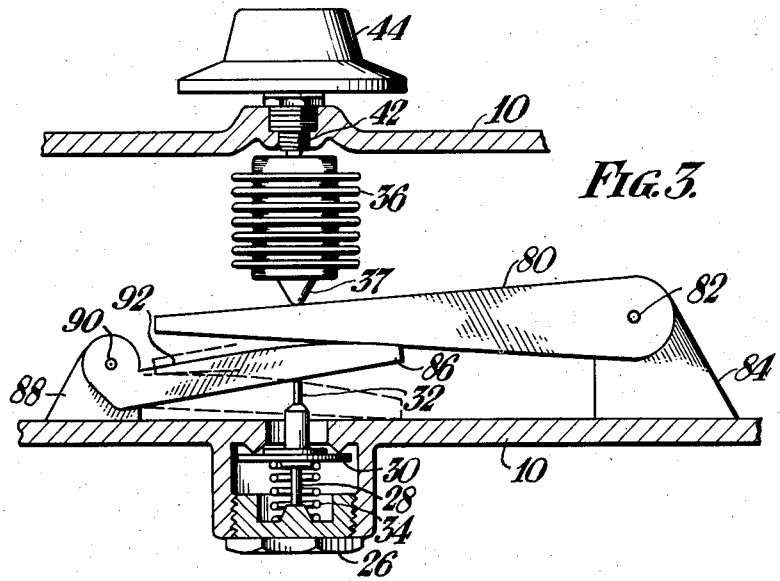
Fig. 3 is a schematic showing of a modified form of the control device.

Referring now to Fig. 3, a modified form of the variable ratio lever means is shown in schematic arrangement with the power element and valve means shown in Figs. 1 and 2 respectively. In this embodiment, the movement of the valve member 30 is gradual or direct acting. More particularly, a main control lever 80 underlies and engages the operating button 37 and is pivoted at one end thereof by means of a pin 82 fixed to a bracket 84 which is mounted on a wall of the casing 10.

A second lever 86 underlies the lever 80 and is similarly pivoted on one wall of the casing 10 by means of a bracket 88 and a pin 90. The lever 86 is engageable with valve stem 32 and provided with a curved surface 92 on the upper side thereof which is adapted to be engaged by the lever 80 during counterclockwise rotation thereof. In the position shown in Fig. 3, the valve spring 34 biases the lever 86 into engagement with the lever 80 and lever 80 into engagement with the operating button 37.

In operation of the embodiment shown in Fig. 3, the closed position of the valve member 30 is the normal position of this member whenever the temperature as sensed by the bulb 40 is above that for which the dial 46 has been set. In this position, a medial portion of the main control lever 80 will engage the end portion of the lever 86 as shown in the drawing. In this position of the levers 80, 86, it will be apparent that the force transmitted by levers 80, 86 from the bellows 36 to the valve member 30 will be maximum. Accordingly, upon a temperature increase of the bulb 40, the bellows member 36 will expand and rotate the lever 80 counterclockwise and the lever 86 clockwise, unseating the valve member 30 with a large force.

The surface 92 is shaped whereby upon downward movement of the levers 80, 86, the engagement point of the lever 80 with the lever 86 gradually shifts toward the pivot point of lever 86 as the angular relationship of the levers 80, 86 changes. In the position of the levers 80, 86 shown in dotted lines, the valve member 30 is in its full open position. Thus, the ratio of movement between the bellows 36 and the valve member 30 gradually increases with opening of the valve member 30. Accordingly, a higher force is applied to the valve member 30 to unseat the same while maintaining normal operating ratio and sensitivity in the open position thereof.

It should now be apparent that by appropriate configuration of the levers, sudden or gradual shifting of movement and force ratio can be obtained. Therefore, the invention is not limited to the application herein shown and described but is adaptable to various conditions and mechanisms.

Figure 4:
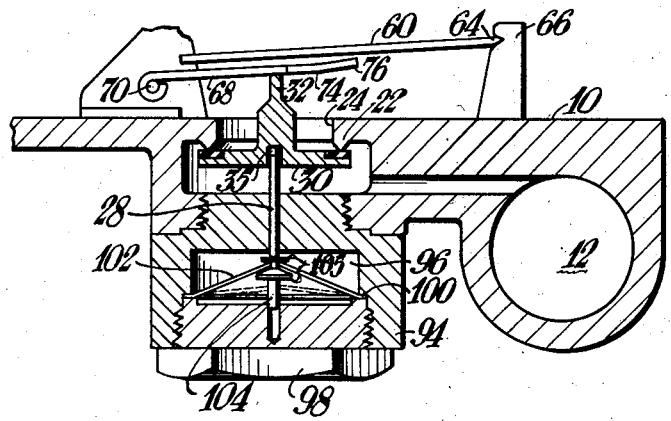
Figs. 4 and 5 are sections similar to Fig. 2 showing other modified forms of the invention.
Figure 7:
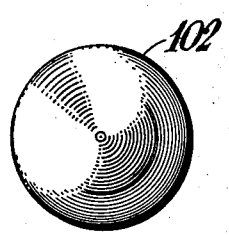
Fig. 7 is a plan view of the detail shown in Fig. 4 showing another embodiment of the same.

To further increase efficiency of the device, a novel negative rate biasing means for the valve member 30 may be substituted for the spring 32 shown in Fig. 1. Referring now to Figs. 4 and 7 wherein one form of said biasing means is shown, a bushing 94 is threaded within the casing 10 and is provided with a tubular extension in the end thereof defining a chamber 96. A cap 98 is threaded in the end of the bushing 94 and encloses the chamber 96. An annular shoulder 100 is formed on a wall of the bushing 94 within the chamber 96 and provides a mounting means for a substantially circular disc 102 (Fig. 7), which is held in engagement with the shoulder 100 by the cap 98.

The disc 88 is provided with a centrally disposed bore in which one end of an operating stem 104 is positioned. The other end of the stem 104 is slidably positioned within a bore in the cap 98 which maintains axial alignment of the stem 104 with the valve stem 28. The upper end of the stem 104 is provided with a pair of flanges 105 which are positioned on opposite sides of the disc 102 to effect movement of the stem 104 with the disc 102. The upper flange 105 is biased into engagement with the valve stem 28 by the disc 102 which is operative as now will be described to bias the valve member 30 toward the seat 22. In this case the valve member 30 is fixed to the stem 28 which is slidably positioned in a bore of the bushing 94.

The disc 102 is formed with a generally curved or disc-shaped configuration and has an inherent bias toward said configuration. With such shape its inherent bias is maximum when flattened a slight amount to the configuration shown in Fig. 4. Upon further flattening of the disc 102, the inherent bias thereof will decrease as its central portion approaches an over-center position with respect to the periphery thereof. In its said over-center position, the disc 102 will be substantially flat and the biasing force thereof on the valve member 30 will be substantially zero.

The disc 102 is preferably positioned whereby its biasing force on the valve member 30 is maximum when the valve member 30 engages the valve seat 22 and minimum when the valve member 30 is in open position. This positioning is accomplished by shaping the disc 102 whereby said disc is in the slightly flattened position above described when the valve member 30 is in engagement with the seat 22, and in a position wherein the central portion thereof is just above its above described over-center portion when the valve member is in open position.

It should now be apparent that the biasing force of the disc 102 on the valve member 30 varies with the displacement of the valve member 30 from the seat 22. With such a biasing means the tendency for the biasing force of the same to aid the snap mechanism in the open position of the valve member 30 is substantially eliminated and accordingly the device accomplishes the objects of the invention.

Figure 6:
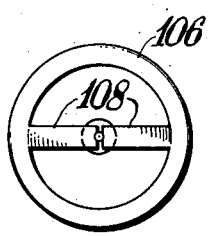
Fig. 6 is a plan view of a detail shown in Fig. 4.

Another form of the negative rate biasing disc is shown in Fig. 6. This embodiment takes the form of a generally circular disc-shaped rim 106 having an inherent bias toward said configuration. The rim 106 is provided with a pair of oppositely disposed spring arms 108, 108 the ends of which may be positioned between the flanges 105, 105. The rim 92 may be positioned with the chamber 96 in the same manner as previously described for the disc 102.

The operation of the embodiment shown in Fig. 6 is substantially the same as described for the disc 102. The rim 106 has an inherent bias toward a curved configuration similar to the disc 102. However, in this case, the biasing force of rim 106 is transmitted through arms 108, 108, and accordingly movement of the arms 94, 94 by the flanges 105, 105 serves to flatten the rim 106 to its overcenter position.

Figure 5:
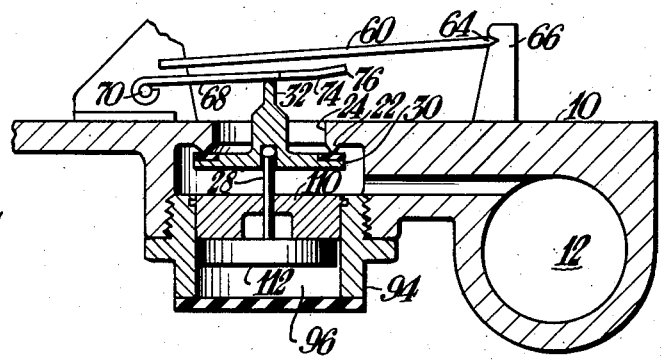

Another embodiment of the negative rate biasing means is shown in Fig. 5. In this form of the invention the upper end of the bushing 94 is provided with a permanently magnetized insert 110. An armature 112 is fixed to the end of the valve stem 32 within the chamber 96 for movement with the valve member 30 and stem 28. The armature 112 is preferably positioned on the stem 28 whereby a minimum air gap exists between the armature 112 and magnet 110 when the valve member 30 is in closed position. Upon movement of the valve member 30 to open position the armature 112 will be positioned at a greater distance from the magnet 110.

In operation of the embodiment shown in Fig. 5, the magnet 110 tends to attract the armature 112 into engagement therewith and thus biases the valve member to closed position. In the open position of the valve member 30, a large air gap exists between the armature 112 and magnet 110 and the biasing force thereof is a minimum. However, the minimum air gap existing when the valve member 30 engages the seat 22 results in a maximum biasing force in this position. Accordingly, the biasing force of the magnet 110 and armature 112 decreases with displacement of the valve member 30 from the seat 22.

Although several embodiments of the invention have been herein shown and described, it will be apparent to those skilled in the art that the construction and arrangement of parts may be in other ways variously embodied or changed without departing from the scope of the invention as defined in the appended claims.

It is claimed and desired to secure by Letters Patent:

1. In a control device, the combination comprising a casing having a passage therethrough for fluid, a valve seat associated with said passage, a valve member movable between open and closed positions relative to said seat for controlling the flow of fluid through said passage, said valve member being positioned upstream of said seat and biased by fluid pressure toward engagement with said seat, means responsive to a condition to be controlled including an element movable in response to a change in said condition, a snap action means between said element and said valve member for transmitting movement therebetween, lever means operatively engageable with said snap action means for effecting a variable ratio of movement of said valve member relative to said element, a pair of levers defined by said lever means and said snap action means having one point of engagement upon opening movement of said valve member to apply maximum opening force to said valve member and having a second engagement point in the open position of said valve member to increase the ratio of movement between said element and said valve member, and a resilient disc having an inherent bias toward a dish-shaped configuration and having a medial portion operatively connected to said valve member, said disc applying a maximum bias to said valve member in said closed position and being flattened to apply a minimum bias to said valve member in an open position.

2. In a control device, the combination comprising a control member movable between open and closed positions relative to a seat for controlling the flow of operative energy, a snap action device for actuating said control member between said positions including a lever movable with a snap action toward said control member, a second lever mounted between said first lever and said control member for transmitting movement therebetween, a first portion defined by said second lever for engagement by said first lever prior to snap movement thereof to effect a first predetermined ratio of movement between said first lever and said control member, and a second portion defined by said second lever for engagement by said first lever during snap movement thereof to effect a second predetermined ratio of movement between said first lever an said control member, a resilient disc having an inherent bias toward a dish shaped configuration and having a medial portion operatively connected to said control member, said disc applying a maximum bias to said control member in said closed position and being flattened to apply a minimum bias to said control member in an open position.

3. A control device as claimed in claim 2 wherein said second lever and said first lever are mounted in parallel relationship and pivoted at their oppositely disposed ends, and said second lever is provided with an upturned portion defining said first portion and a medial portion defining said second portion, said first and second portions being spaced relative to the pivot point of said second lever.

4. In a control device, the combination comprising a control member movable between open and closed positions for controlling the flow of operative energy, a snap action device for actuating said control member between said positions including a first lever movable with a snap action toward said control member, a second lever disposed between said first lever and said control member and transmitting movement therebetween, a first portion defined by said second lever engaging said first lever prior to snap movement thereof and effecting a first predetermined ratio of movement between said first lever and said control member, a second portion defined by said second lever engaging said first lever during snap movement thereof and effecting a second predetermined ratio of movement between said first lever and said control member, a resilient disc having an inherent bias toward a dish-shaped configuration and having a movable medial portion operatively connected to said control member, said disc ap plmbny umxm -- EEiTgTa ai AR AR AR A said disc applying a maximum bias to said control member in the closed position thereof, and abutment means associated with said medial portion and limiting movement thereof to an overcenter position whereby a minimum bias is applied to said control member in the open position thereof.

5. A control device comprising a casing having an inlet and an outlet for the flow of fluid, a valve seat disposed in said casing, a valve member movable between open and closed positions relative to said valve seat for controlling fluid flow through said casing, a snap action device for actuating said valve member between said positions including a first lever movable with a snap action toward said valve member, a second lever disposed between said first lever and said valve member for transmitting movement therebetween, a first portion defined by said second lever for engagement by said first lever prior to snap movement thereof to effect a first predetermined ratio of movement between said first lever and said valve member, and a second portion defined by said second lever for engagement by said first lever during snap movement thereof to effect a second predetermined ratio of movement between said first lever and said valve member, a stem extending from said valve member, a resilient disc peripherally mounted in said casing and having a deflectable medial portion operatively connected to said stem, said disc having an inherent bias to a dish-shaped configuration for urging said valve member to said closed position and being flattened upon opening of said valve member so that a minimum bias is provided when the valve member is in open position.

References Cited in the file of this patent

UNITED STATES PATENTS

| | | |
|---|---|---|
| 64,070 | Burridge | Apr. 23, 1867 |
| 555,738 | Rushton | Mar. 3, 1896 |
| 1,013,507 | Moll | Jan. 2, 1912 |
| 1,184,940 | Fulton | May 30, 1916 |
| 1,204,386 | Halsey | Nov. 7, 1916 |
| 1,404,898 | Ryan | Jan. 31, 1922 |
| 1,681,911 | Spencer | Aug. 21, 1928 |
| 1,781,287 | Mayo | Nov. 11, 1930 |
| 1,988,345 | Vaughn | Jan. 15, 1935 |
| 2,035,166 | Kimball | Mar. 24, 1936 |
| 2,069,863 | Taylor et al. | Feb. 9, 1937 |
| 2,219,441 | Carnes | Oct. 29, 1940 |
| 2,236,908 | Jackson | Apr. 1, 1941 |
| 2,238,837 | Vaughn et al. | Apr. 15, 1941 |
| 2,293,556 | Newton | Aug. 18, 1942 |
| 2,387,792 | Holmes | Oct. 30, 1945 |
| 2,642,309 | Wasser | June 16, 1953 |
| 2,649,815 | Kaye | Aug. 25, 1953 |
| 2,690,321 | Luna | Sept. 28, 1954 |

FOREIGN PATENTS

| | | |
|---|---|---|
| 380,945 | Great Britain | Sept. 29, 1932 |